United States Patent [19]
Dessuise

[11] Patent Number: 6,076,452
[45] Date of Patent: Jun. 20, 2000

[54] DEVICE FOR HEATING AND/OR COOKING FOOD

[75] Inventor: Patrice Dessuise, Martignat, France

[73] Assignee: Beaba, Oyonnax, France

[21] Appl. No.: 09/402,116

[22] PCT Filed: Feb. 2, 1999

[86] PCT No.: PCT/FR99/00206

§ 371 Date: Sep. 29, 1999

§ 102(e) Date: Sep. 29, 1999

[87] PCT Pub. No.: WO99/39618

PCT Pub. Date: Aug. 12, 1999

[30] Foreign Application Priority Data

Feb. 5, 1998 [FR] France .................................... 98 01571

[51] Int. Cl.⁷ .................................................... A47J 27/04
[52] U.S. Cl. .............................. 99/410; 99/473; 126/369; 126/20
[58] Field of Search ............................. 99/410, 411, 412, 99/467, 473; 126/369, 20, 369.1; 219/401

[56] References Cited

U.S. PATENT DOCUMENTS

| | | | |
|---|---|---|---|
| 1,740,205 | 12/1929 | Schmidt | 126/369 |
| 4,010,736 | 3/1977 | Sacomani | 126/369 |
| 4,574,776 | 3/1986 | Hidle | 126/369 |
| 4,655,192 | 4/1987 | Jovanovic | 126/20 |

FOREIGN PATENT DOCUMENTS

| | | |
|---|---|---|
| 165187 | 12/1985 | European Pat. Off. . |
| 2586922 | 3/1987 | France . |

*Primary Examiner*—Reginald L. Alexander
*Attorney, Agent, or Firm*—Wall Marjama Bilinski & Burr

[57] ABSTRACT

The invention concerns a device for heating and/or cooking food comprising: a steam generator producing steam for heating or cooking food; a cooking container receiving a removable cooking basket provided with through apertures arranged in the proximity of the base to allow the steam through. The container being reversibly sealed at its upper end with a removable lid. The removable lid is provided with a through aperture to allow the steam generator to communicate with the container inside, and particularly the cooking basket inside. The container is provided with a through aperture arranged substantially near the top end of the wall defining it.

3 Claims, 3 Drawing Sheets

DEVICE FOR HEATING AND/OR COOKING FOOD

BACKGROUND OF THE INVENTION

The invention relates to a device for heating and/or cooking food. More specifically, the invention relates to an apparatus of this type for cooking food for children.

It is well-known nowadays to carry out mixings and to heat, either concomitantly or consecutively, the food mixture thus obtained within one and the same device. A device of this type has, for example, been described in document FR-A-2,586,922. Basically, this device is composed of a steam generator, producing steam, particularly by Joule effect, and of a container for receiving the food to be mixed and heated. According to the teachings of this document, the steam is conveyed via a pipe to the centre and to the bottom of said container receiving the food to be mixed and heated in the proximity of a rotary blade for mixing. Therefore, through the dual effect of conveying steam to the bottom of said container and the rotation of the mixing blade, providing a degree of evening-out of the temperature, the desired result is achieved. However, this device allows this result to be achieved only when mixing is actually required. Moreover, the volume occupied by the central steam-supply pipe is relatively large, thereby restricting the capacity of the device in question.

SUMMARY OF THE INVENTION

The object of the invention is to propose a much simpler device which has no steam-supply pipe, allowing homogeneous heating of the food even in the absence of a mixing stage and also simplifying the subsequent stage of washing and cleaning said container.

According to the invention, the device for heating and/or cooking food, comprises:

a steam generator for heating or cooking food;

a cooking container, receiving a removable cooking basket provided with through apertures to allow the steam through, said container being reversibly sealed at its upper end with a removable lid.

The invention is characterized:

in that the removable lid is provided with a through aperture, to allow the steam generator to communicate with the inside of said container, and particularly of the cooking basket;

in that the through apertures of the cooking basket are arranged in the proximity of its base;

and in that the container is provided with a through aperture arranged substantially near the top end of the wall defining it.

In other words, the invention consists in providing a forced circuit for conveying the steam so that, given the respective positioning of the steam-inlet and -outlet holes inside and outside the container, to form a type of baffle in which the steam will pass through the entire cooking basket, the inlet hole actually being located above the cooking basket. Thus, in order to be able to escape, the steam has to pass through the contents of the cooking basket before rising along the side wall defining the container and thus gaining access to the outlet hole provided in the upper end of said container, as required.

In this manner, food is heated and cooked homogeneously without the need for a mixing stage when, moreover, this is not required.

Given the absence of any valve, it will be understood that cooking takes place at atmospheric pressure.

The device according to the invention may also include a mixing blade located in the base of the container and driven in rotation by means of an electric motor, in a completely conventional manner.

BRIEF DESCRIPTION OF THE DRAWINGS

The way in which the invention may be implemented and the advantages arising therefrom will become more clearly apparent from the following illustrative embodiment which is given by way of indication and not by way of limitation in support of the appended figures.

DESCRIPTION OF THE INVENTION

Figure 1:
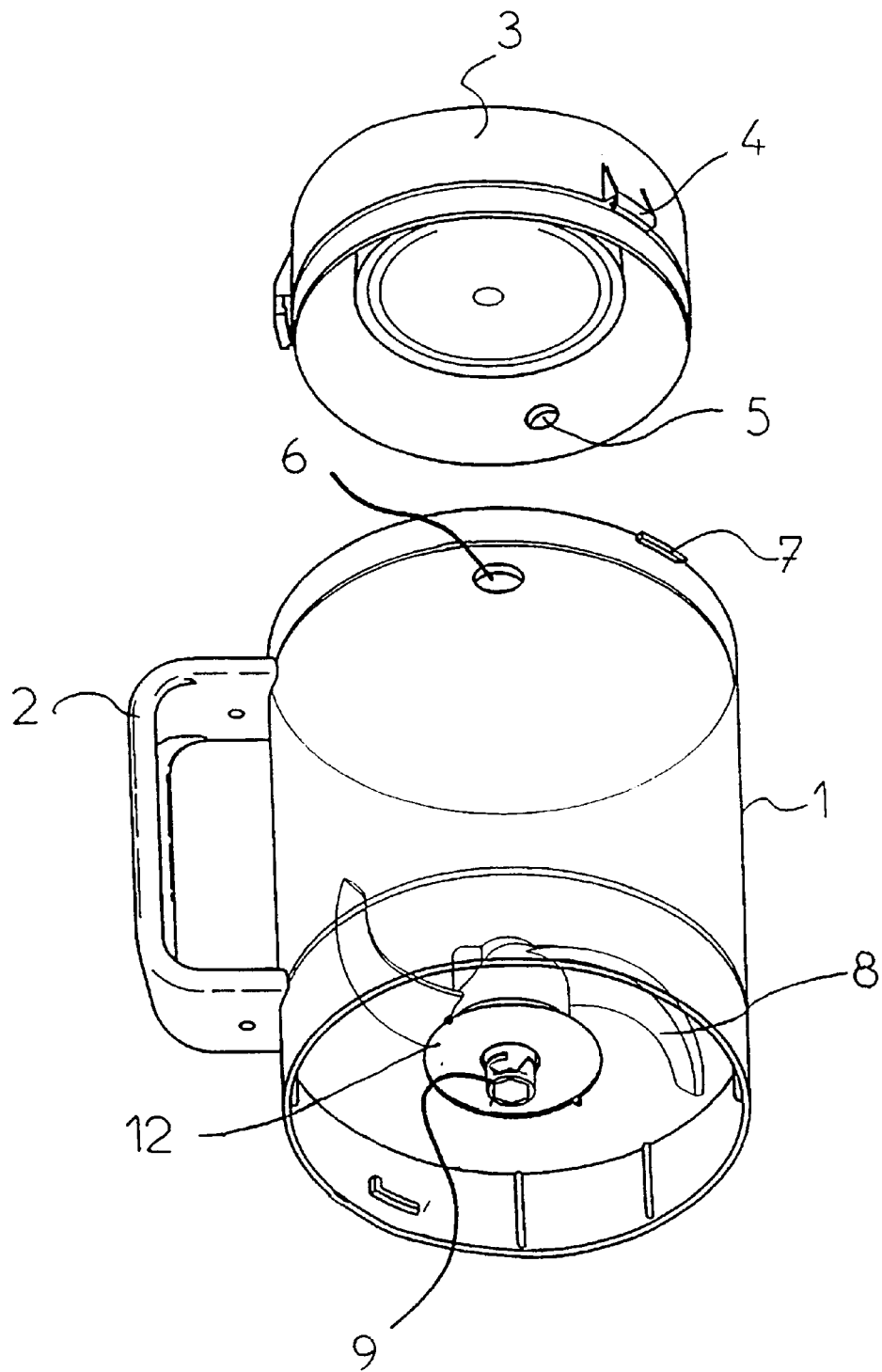
FIG. 1 is a diagrammatic representation in perspective of the container according to the invention.

The device according to the invention basically includes a bowl or container (1), typically made from transparent polysulphone, this bowl having symmetry of revolution, particularly cylindrical symmetry of revolution. It includes a base (12) via which it rests on the device according to the invention. It also comprises a gripping handle (2) and a removable lid (3). This lid includes fastening tabs (4) for interacting with corresponding projections (7) arranged on the top end of the side wall defining said bowl. In this way, relatively leaktight closure of the lid on the container (1) is achieved.

Figure 3:
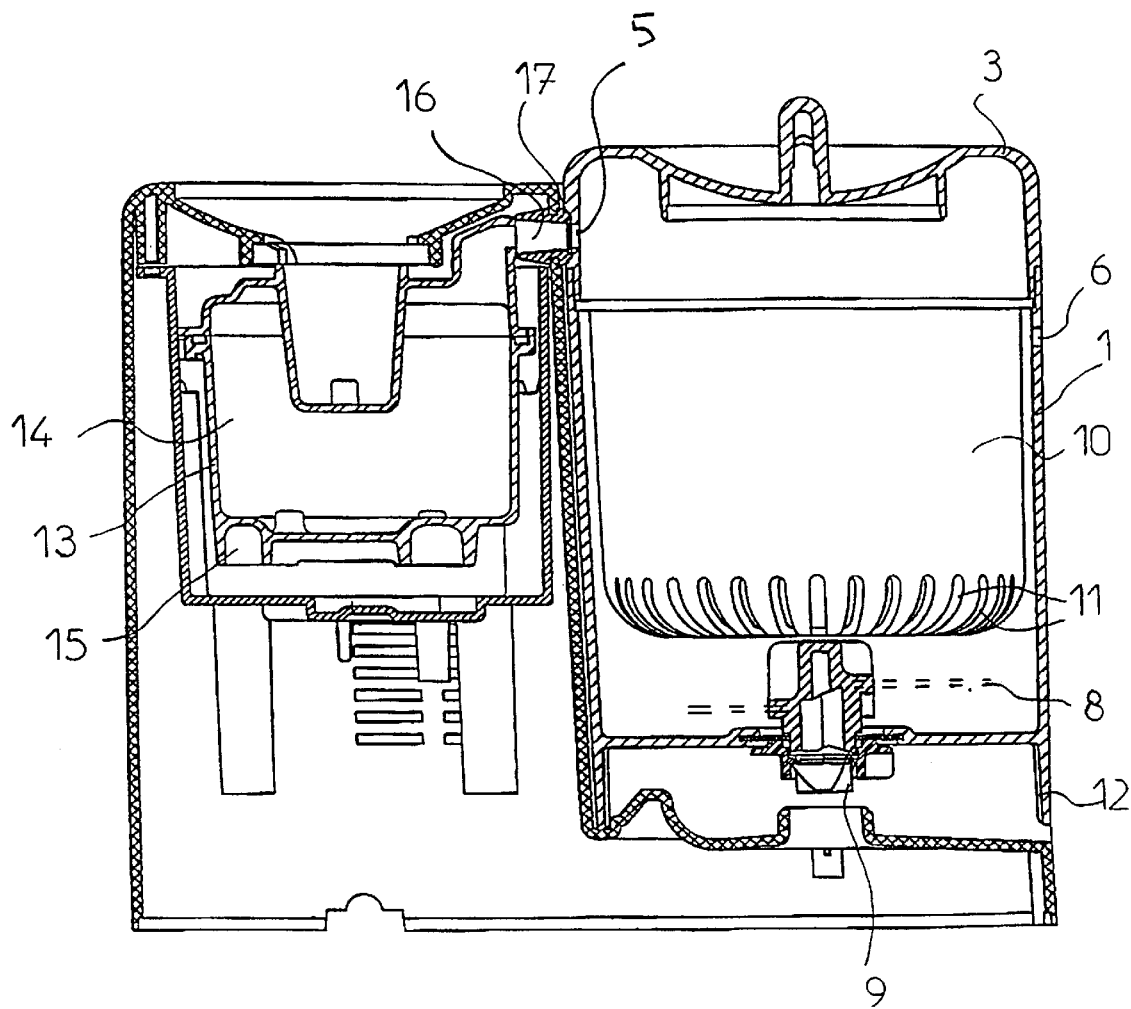
FIG. 3 is a diagrammatic representation in section of the device according to the invention.

Moreover, the lid (3) is in the form of a portion of a cylinder, complementing the bowl (1), and is provided on the side wall defining said cylinder with a through aperture (5) intended, when the bowl is in position on the device according to the invention, to be positioned in a relatively leaktight manner with regard to the outlet of a steam generator (13) incorporated within the device according to the invention, so as thereby to place the inside of the bowl (1) in communication with said steam generator (see FIG. 3).

Figure 2:
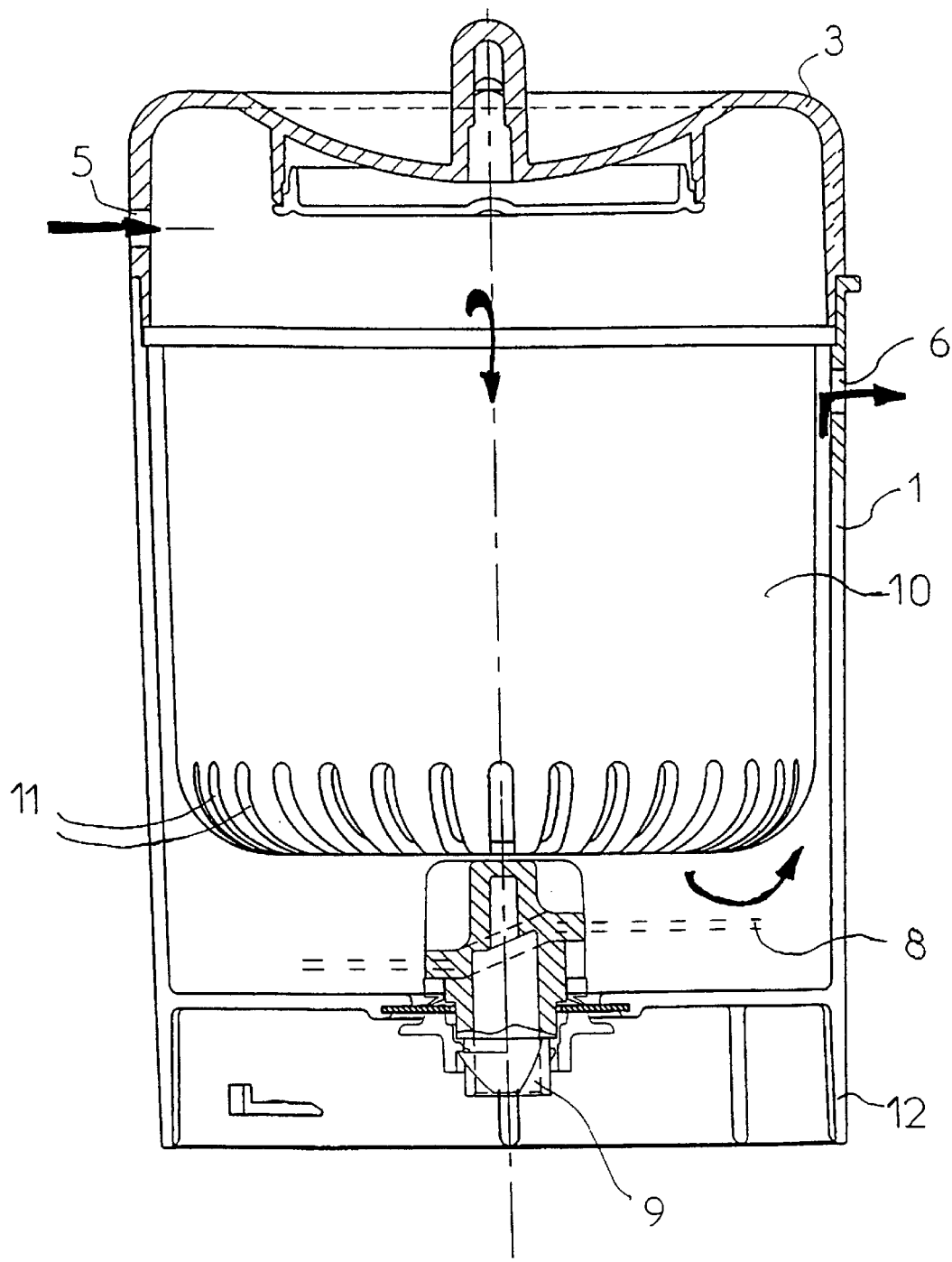
FIG. 2 is a diagrammatic representation in section of said container.

Furthermore, the bowl (1) includes, near the top end of the side wall defining it, a through aperture (6), as may be seen clearly in FIGS. 1 and 2.

The bowl (1) is intended for receiving a cooking basket (10) which may be seen clearly in FIG. 2, said basket resting via a peripheral, annular upper projection (12) on a shoulder (13) provided for this purpose within the side wall defining the bowl.

According to the invention, this basket (10) is provided with a number of through apertures (11), all arranged in its base, as may be seen clearly in FIG. 2. These through apertures (11) consist typically of openings extending between the bottom and the base of the side wall defining said basket, uniformly spaced and distributed, and circular holes arranged in the bottom of said basket.

A number of arrows has been used to show the path followed by the steam, given the respective positioning of the various apertures. Thus, the steam enters the bowl via the aperture (5) arranged in the removable lid (3). As the upper opening of the cooking basket (10) emerges directly under the lid, the steam is then conveyed inside said basket from which it exits via the through apertures (11) in order to rise along the side wall defining said bowl, so as to escape via the hole (6).

The steam thus begins by following a descending path inside the cooking basket, from the aperture (5) of the lid (3)

to the apertures (11), then an ascending path from said apertures to the outlet hole (6) of the bowl. Thus, the contents of a cooking basket (10) are in direct contact with the steam, in order thus to allow it either to be heated or to be cooked. Owing to the uniform and uniformly distributed positioning of the through apertures (11) arranged in the cooking basket, homogeneous distribution of the steam is thereby achieved and therefore cooking or heating which is also homogeneous, optionally reducing the cooking or heating time.

According to the invention, the bowl (1) may also be provided with a mixing blade (8), driven in rotation by means of a nut (9) engaging on a drive shaft which is itself actuated by an electric motor, advantageously located under the steam generator, and a belt.

FIG. 3 shows the positioning of the bowl (1) within the device according to the invention. Said bowl is placed in the position intended for it and the aperture (5) provided in the lid (3) is positioned opposite the pipe (16) emanating from the steam generator (13) by simple rotation, this rotation being limited in terms of angle by a stop (not shown) arranged in said lid and interacting in a complementary manner with a means incorporated in the chassis of the device, in such a manner that, at the end of travel, said aperture is correctly positioned. Furthermore, during this operation, the lid (3) exerts a certain pressure on a deformable seal (17), positioned in the outlet zone of the pipe (16), so as to guarantee a degree of leaktightness during transfer of the steam from the steam generator (13) to the bowl (1).

This steam generator comprises, in a known manner, a receptacle (14) for receiving the water required to produce steam, the heat source consisting of an annular electrical resistance element (15) placed under said receptacle.

The advantage in the respective arrangement of the steam-inlet and -outlet holes is designed to provide greater heating efficiency and greater homogeneity, without thereby adversely affecting the simplicity of implementation and use of a device of this type.

What is claimed is:

1. Device for heating and/or cooking food, comprising:

a steam generator for heating or cooking food;

a cooking container (1), receiving a removable cooking basket (10) provided with through apertures (11) to allow the steam through, said container being reversibly sealed at its upper end with a removable lid (3);

characterized:

in that the removable lid (3) is provided with a through aperture (5), to allow the steam generator to communicate with the inside of said container (1), and particularly of the cooking basket (10);

in that the through apertures (11) of the cooking basket (10) are arranged in the proximity of its base;

and in that the container (1) is provided with a through aperture (6) arranged substantially near the top end of the wall defining it.

2. Device for heating and/or cooking food according to claim 1, characterized in that the through apertures (11) arranged in the base of the cooking basket (10) consist of openings extending between the bottom and the base of the side wall defining said basket, uniformly spaced and distributed, and circular holes arranged in the bottom of said basket.

3. Device for heating and/or cooking food according to claim 1, characterized in that the container (1) also includes a mixing blade (8) located in the base of the container and driven in rotation by means of an electric motor incorporated within said device.

* * * * *